United States Patent [19]

Abe et al.

[11] Patent Number: 4,759,989

[45] Date of Patent: * Jul. 26, 1988

[54] ELECTRODE SUBSTRATE FOR FUEL CELL

[75] Inventors: Hikonori Abe; Masayuki Funabashi, both of Iwaki, Japan

[73] Assignee: Kureha Kagaku Kogyo Kabushiki Kaisha, Tokyo, Japan

[*] Notice: The portion of the term of this patent subsequent to Jul. 26, 2005 has been disclaimed.

[21] Appl. No.: 931,085

[22] Filed: Nov. 17, 1986

[30] Foreign Application Priority Data

Nov. 25, 1985 [JP] Japan .................................. 60-264542

[51] Int. Cl.⁴ .......................... B32B 9/00; B32B 3/30; H01M 4/96; B05D 3/02

[52] U.S. Cl. .................................... 428/408; 428/168; 428/283; 427/227; 264/29.1; 429/44; 429/210

[58] Field of Search ....................... 428/167, 172, 408; 423/447.1, 447.2; 429/12, 44, 162, 210, 253; 264/29.1; 403/DIG. 5

[56] References Cited

U.S. PATENT DOCUMENTS

| 3,829,327 | 8/1974 | Omori et al. ........................ 429/218 |
| 3,960,601 | 6/1976 | Schulz ................................. 429/212 |
| 3,998,689 | 12/1976 | Kitago et al. . |
| 4,064,207 | 12/1977 | DeCrescente et al. .......... 428/408 X |
| 4,115,528 | 9/1978 | Christner et al. ............. 423/447.1 X |
| 4,165,349 | 8/1979 | Sandelli ............................... 264/29.1 |
| 4,292,379 | 9/1981 | Kothmann ....................... 429/210 X |
| 4,365,008 | 12/1982 | DeCasperis et al. ........... 428/408 X |
| 4,382,113 | 5/1983 | Schwartz et al. .................... 428/408 |
| 4,426,340 | 1/1984 | Goller et al. ........................ 264/29.1 |
| 4,434,206 | 2/1984 | Fududa et al. ....................... 428/288 |
| 4,506,028 | 3/1985 | Fukuda et al. . |
| 4,522,895 | 6/1985 | Shigeta et al. . |
| 4,579,789 | 4/1986 | Fukuda et al. . |

FOREIGN PATENT DOCUMENTS

| 2128395 | 4/1984 | United Kingdom . |
| 2157481 | 10/1985 | United Kingdom . |
| 2157277A | 10/1985 | United Kingdom . |
| 2158286 | 11/1985 | United Kingdom . |
| 2169273A | 7/1986 | United Kingdom . |
| 2157482 | 4/1987 | United Kingdom . |

OTHER PUBLICATIONS

European Search Report.

Primary Examiner—John E. Kittle
Assistant Examiner—Susan S. Rucker
Attorney, Agent, or Firm—Nixon & Vanderhye

[57] ABSTRACT

Disclosed herein is an electrode substrate for a fuel cell, wherein at least a part of the electrode substrate comprises a flexible carbon material obtained from a composite material comprising carbon fibers of not less than 1 mm in mean length which have been treated at a temperature of not lower than 1000° C. and a binding agent, the electrode substrate being contacted with flow channels of a reactant gas and the flexible carbon material comprising carbon lumps derived from the binding agent which are dispersed in the matrix of the carbon fibers and restrain a plurality of the carbon fibers and the carbon fibers slidably held to one another by the carbon lumps.

17 Claims, 6 Drawing Sheets

ELECTRODE SUBSTRATE FOR FUEL CELL

BACKGROUND OF THE INVENTION

The present invention relates to an electrode substrate for a fuel cell, and more specifically relates to an electrode substrate in contact with flow channels for a reactant gas, and wherein at least a part of the electrode substrate comprises a flexible carbon material as a reactant gas diffusion part. The term, "electrode substrate for a fuel cell" as used in connection with the present invention means all substrates which become an electrode for a fuel cell either by applying a catalyst to the substrate itself or by stacking on the substrate a porous electrode carrying a previously applied catalyst.

The flexible carbon material according to the present invention is obtained by carbonizing a composite material comprised of carbon fibers and a binding agent, wherein carbon lumps are derived from the binding agent and are dispersed in the matrix of the carbon fibers so as to restrain a plurality of the carbon fibers while yet slidably holding the fibers one to another by means of the carbon lumps.

In recent years, carbon materials made of carbon fibers as the basic material have been used in various industrial fields. Increasing usage of carbon fiber-based materials has, in turn, increased market demands for production of, and physical product improvements for, such materials. Carbon fiber-based materials are generally recognized as exhibiting excellent physical properties, for instance, heat-resistance, corrosion-resistance, conductivity, mechanical strength, and the like.

On the other hand, there have also been high demands for fuel cells for generating clean energy which can freely make and break electrical circuits, normalize the operation of thermal power generation or water power generation, and/or improve efficiencies of systems employing fuel cells.

Previously, a bipolar separator-type fuel cell has been provided with a bipolar separator obtained by mechanically ribbing an impermeable thin plate of graphite.

In addition, to the above-mentioned bipolar separator-type fuel cell, monopolar-type electrode substrates (i.e., a substrate in which one of the sides thereof is ribbed and the other side of which has a flat electrode surface so that a reactant gas diffuses from the ribbed side to the flat side of the electrode) are known.

Monopolar-type electrode substrates for a fuel cell have been proposed to be fabricated by press-molding short carbon fibers as the base (refer to U.S. Pat. No. 4,506,028). The electrode substrate obtained by this conventional method of production consists of one layer which has a uniform structure as a whole.

In an electrode substrate having a uniform single layer construction, (i.e., where the bulk density of the electrode substrate is large), since the gas-diffusion coefficient is small, rapid decrease of electrode substrate performance occurs because the limiting current density becomes smaller and the retained amount of electrolytic solution is insufficient. That is, such an electrode substrate exhibits a short life. On the other hand, in the case where the bulk density of the electrode substrate is small, the electrode substrate has insufficient mechanical strength, such as bending strength.

The present inventors have offered a composite electrode substrate which has been produced by press-molding and heat treatment (rather than by more difficult mechanical processing) using short carbon fibers as the basic material and providing the flow channels of a reactant gas near the center of the thickness of a porous carbonaceous gas-diffusion layer. The obtained composite electrode substrate exhibits excellent physical properties similar to those separators having a unitary body with a carbonized electrode substrate (refer to U.S. Pat. No. 4,522,895). According to the invention, it has become possible to use an electrode substrate which has a gas-diffusion portion exhibiting a large gas-diffusion coefficient (namely, a small bulk density). Furthermore, the contact resistance of the electrode substrate is reduced by a large margin as compared to conventional monopolar-type and bipolar-type substrates by uniting the separator in the body with the carbonized electrode substrate.

The electrode substrate of this invention obviates conventional ribbing and boring steps by using a binding material comprising a thermosetting resin of a specified carbonizing yield and a pore-regulator which is thermally decomposed at a temperature higher than the molding temperature. The porous carbonaceous layer is thus formed so that desirable continuous pores are formed in the porous carbonaceous layer but, as will be described later, it was impossible to avoid exfoliation of the porous carbonaceous layer from the gas-impermeable layer (the compact carbonaceous layer) in the steps of carbonization and calcination in the process of producing the electrode substrate. Particularly, when a larger substrate having a broad surface was produced, exfoliation occurred in spite of elevating the temperature to the calcining temperature, resulting in low production yields. Accordingly, an improvement of the process for producing the electrode substrate was definitely needed.

It was considered by the present inventors that exfoliation occurred in the calcination step (up to the maximum temperature of 3000° C.) of the molded substrate due to the thermal expansion rate difference between the porous carbonaceous layer and the gas-impermeable layer when the substrate was subjected to elevated temperatures or to the thermal shrinkage difference between both layers when the calcined substrate was cooled to room temperature. Accordingly, methods of reducing or removing the expansion and shrinkage differences between the two layers were examined using a buffer layer interposed between the two layers, the buffer layer thereby compensating for the above-mentioned expansion and shrinkage differences.

As a result, the present inventors have examined a flexible graphite sheet which has relatively large expansion and shrinkage rates, improved adhesion properties, and is not highly gas permeable. By interposing the flexible graphite sheet between the porous carbonaceous layer of the above-mentioned electrode substrate and the separator and by joining the sheet to the two materials via a carbonizable adhesive, the present inventors have found that it is possible to prevent interlayer exfoliation which has hitherto been a problem and to produce a large-sized composite electrode substrate.

The flexible graphite sheet is obtained by subjecting naturally occurring graphite to acid treatment and further to heating, thereby expanding the interlayer of carbon-to-carbon bonding and compression-molding the thus form so-called expanded graphite particles. The thus obtained flexible graphite sheet can be made to be adhesive because of its scaly surface with some gas-permeability which allows impregnation of an adhesive and further, such a flexible graphite sheet is most suitable for absorbing expansion and shrinkage of the materials for the present invention due to the above-mentioned flexiblity properties.

As a result of further continued studies of the present inventors, it has been found surprisingly that the flexible carbon material (which will be defined below) is obtained by carbonizing a composite material comprising carbon fibers of not less than 1 mm in mean length which have been treated at a temperature of not lower than 1000° C. and a binding agent.

In considering that development of carbon materials has focused upon the physical properties thereof, for example, mechanical strength, corrosion-resistance, conductivity, etc., it was not expected (nor was it intended) that the above-mentioned flexible carbon material could be obtained.

The present inventors have further found that in the cases where the above-mentioned flexible carbon material is used as the electrode substrate in the composite electrode substrate for a fuel cell, even in the case where the above-mentioned flexible graphite sheet is not used between the electrode substrate and the separator, the electrode substrate can be joined firmly with the separator without cracking, exfoliation, warping, etc. at the time the electrode substrate is produced.

The fundamental object of the present invention lies in the use of a novel flexible carbon material having a particularly novel microstructure as the electrode layer in the composite electrode substrate which is in contact with the flow channels for a reactant gas in a fuel cell. The flexible carbon material is obtained from a composite material comprising carbon fibers of not less than 1 mm in mean length which have been treated at a temperature of not lower tan 1000° C. and a binding agent, wherein carbon lumps derived from the binding agent are dispersed in the matrix of the carbon fibers so as to restrain a plurality of the carbon fibers thereby slidably holding the fibers one to another.

SUMMARY OF THE INVENTION

In a first aspect of the present invention, there is provided an electrode substrate for a fuel cell, wherein at least a part of the electrode substrate comprises a flexible carbon material obtained from a composite material comprising carbon fibers of not less than 1 mm in mean length which have been treated at a temperature of not lower than 1000° C. and a binding agent, the electrode substrate being contacted with flow channels of a reactant gas and the flexible carbon material comprising carbon lumps derived from the binding agent which are dispersed in the matrix of the carbon fibers and restrain a plurality of the carbon fibers and the carbon fibers slidably held to one another by the carbon lumps.

In a second aspect of the present invention, there is provided an electrode substrate for a fuel cell, wherein the flexible carbon materials as the gas-diffusion part have been respectively stacked on respective top surfaces of ribs on both sides of a ribbed separator, ribs on the one of the separator sides being perpendicular to those on the other side thereof.

In a third aspect of the present invention, there is provided an electrode substrate for a fuel cell, wherein the flexible carbon materials have been mechanically ribbed and respectively stacked on both sides of a separator so that the respective top surfaces of the ribs are in contact with both sides of the separator.

In a fourth aspect of the present invention, there is provided an electrode substrate for a fuel cell, wherein the flexible carbon materials have been provided with ribs by molding a rib material on the flexible carbon material, the ribs being stacked on both surfaces of a separator so that the respective top surfaces of the ribs contact both surfaces of the separator.

In a fifth aspect of the present invention, there is provided an electrode substrate for a fuel cell, comprising (1) two flexible carbon materials, one side of each having a plurality of mutually parallel flow channels (provided by mechanical ribbing) for a reactant gas, the ribbed flexible carbon materials being joined to both surfaces of a separator so that the respective top surfaces of the ribs contact both surfaces of the separator and the flow channels in one of the ribbed flexible carbon materials are perpendicular to those in another ribbed flexible carbon material, (2) the separator having extended parts which extend beyond a periphery of the flexible carbon material, which is parallel to the flow channels of a reactant gas therein and (3) peripheral sealers joined to the extended parts of the separator.

In a sixth aspect of the present invention, there is provided an electrode substrate for a fuel cell, comprising (1) two ribbed flexible carbon materials obtained by integrally molding ribs on the flexible carbon material, the ribbed flexible carbon materials being joined to both surfaces of a separator so that respective top surfaces of the ribs contact both surfaces of the separator such that flow channels of a reactant gas formed by the molded ribs in one of the ribbed flexible carbon materials are perpendicular to those in the other ribbed flexible carbon material, (2) the separator having extended parts which extend beyond a periphery of the flexible carbon material, which is parallel to the flow channels of a reactant gas therein, and (3) peripheral sealers joined to the extended parts of the separator.

In a seventh aspect of the present invention, there is provided an electrode substrate for a fuel cell comprising (1) the two flexible carbon materials on one side of each of which a plurality of mutually parallel flow channels have been provided by mechanical ribbing, the ribbed flexible carbon materials being joined on both surfaces of a separator so that the respective top surfaces of the ribs contact with the both surfaces of the separator and the flow channels of a reactant gas in one of the ribbed flexible carbon materials are perpendicular to those in the another ribbed flexible carbon material, (2) the separator having extended parts which extend beyond the flexible carbon material and (3) a manifold material provided with a flow passage for supplying a reactant gas, joined to the extended part of the separator.

In an eighth aspect of the present invention, there is provided an electrode substrate for a fuel cell comprising (1) two ribbed flexible carbon materials formed by integrally molding ribs on the flexible carbon material, the ribbed flexible carbon materials being joined to both surfaces of a separator so that the respective top surfaces of the ribs contact both surfaces of the separator such that the flow channels formed by the molded ribs in one of the ribbed flexible carbon materials are perpendicular to those in the other ribbed flexible carbon material, (2) the separator having an extended part which extends beyond the flexible carbon material and (3) a manifold material provided with a flow passage for supplying a reactant gas, joined to the extended part of the separator.

BRIEF EXPLANATION OF THE DRAWINGS

Of the attached drawings.

DETAILED DISCRIPTION OF THE INVENTION

The present invention principally relates to an electrode substrate for a fuel cell, wherein at least a part of the electrode substrate comprises a flexible carbon material obtained from a composite material comprising carbon fibers of not less the 1 mm in mean length which have been treated at a temperature of not lower than 1000° C. and a binding agent, the electrode substrate being contacted with flow channels of a reactant gas, and the flexible carbon material comprising carbon lumps derived from the binding agent which are dispersed in the matrix of the carbon fibers and restrain a plurality of the carbon fibers, the carbon fibers moreover being slidably held one to another by means of the carbon lumps.

Secondly, the present invention relates to an electrode substrate for a fuel cell wherein the flexible carbon materials as the gas-diffusion part have been respectively stacked on the respective top surfaces of ribs on both surfaces of a ribbed separator, the ribs on the one surface of the separator being perpendicular to those on another surface thereof.

Thirdly, the present invention relates to an electrode substrate for a fuel cell wherein the flexible carbon materials have been mechanically ribbed and respectively stacked on both surfaces of a separator so that the respective top surfaces of the ribs contact with both surfaces of the separator.

Fourthly, the present invention relates to an electrode substrate for a fuel cell, wherein the flexible carbon materials have been provided with ribs by molding a rib material (hereinafter referred to as the mold rib) which has been separately prepared by subjecting a mixture comprising short carbon fibers, a binding agent and a pore-regulator to thermal press-molding, on the flexible carbon material so as to form it into one body with the flexible carbon material and have been stacked on both surfaces of the separator so that the respective top surfaces of the mold ribs contact with the both surfaces of the separator.

Fifthly, the present invention relates to an electrode substrate for a fuel cell, comprising (1) two flexible carbon materials on one side of each of which a plurality of mutually parallel flow channels of a reactant gas have been provided by mechanical ribbing, the ribbed flexible carbon materials being joined to both surfaces of a separator so that the respective top surfaces of the ribs contact the both surfaces of the separator and the flow channels in one of the ribbed flexible carbon materials are perpendicular to those in the ribbed flexible carbon material, (2) the separator having extended parts which extend beyond a periphery of the flexible carbon material, which is parallel to the flow channels of a reactant gas therein and (3) peripheral sealers each of which comprises a gas-impermeable and compact carbon material and has been joined to the extended part of the separator.

Sixthly, the present invention relates to an electrode substrate for a fuel cell, comprising (1) two ribbed flexible carbon materials obtained by integrally molding ribs on the flexible carbon material so as to form into one body with the flexible carbon material, the ribbed flexible carbon materials being joined to both surfaces of a separator so that the respective top surfaces of the ribs contact with the both surfaces of the separator and flow channels of a reactant gas formed by the mold ribs in one of the ribbed flexible carbon materials are perpendicular to those in the another ribbed flexible carbon material, (2) the separator having extended parts which extend beyond a periphery of the flexible carbon material, which is parallel to the flow channels of a reactant gas therein, and (3) peripheral sealers each of which comprises a gas-impermeable and compact carbon material and has been joined to the extended part of the separator.

Concerning the last two mentioned electrode substrates for a fuel cell, as has been described as above, since the flexible carbon material has a flexibility before and after carbonization and calcination, the flexible carbon material exhibits its own buffer action to thermal expansion and shrinkage the steps of calcining and cooling.

Accordingly, the conventionally used flexible graphite sheet may not be used in the above-mentioned cases. However, in the case of producing a composite electrode substrate of a large size, such a flexible graphite sheet may be further interposed between the flexible carbon material or the ribbed flexible carbon material and the separator. In such a case, it is desirable, after adhesively joining the materials together, to calcine the thus joined material under a reduced pressure and/or in an inert atmosphere at a temperature not lower than 800° C., thereby producing the composite electrode substrate into one body as carbon from the view point of obtaining excellent conductivity. In addition, between the peripheral sealer and the separator, a flexible graphite sheet or a layer of fluorocarbon resin may be interposed.

In the seventh place, the present invention relates to an electrode substrate for a fuel cell comprising (1) the two flexible carbon materials on one side of each of which a plurality of mutually parallel flow channels have been provided by mechanical ribbing, the ribbed flexible carbon materials being joined on both surfaces of a separator so that the respective top surfaces of the ribs contact both surfaces of the separator and the flow channels of a reactant gas in one of the ribbed flexible carbon materials are perpendicular to those in the other ribbed flexible carbon material, (2) the separator having an extended part which extends beyond the flexible carbon material and (3) a manifold material provided with a flow passage for supplying a reactant gas, which comprises a gas-impermeable and compact carbon material and has been joined to the extended part of the separator.

In the eighth place, the present invention relates to an electrode substrate for a fuel cell comprising (1) two ribbed flexible carbon materials formed by molding mold ribs on the flexible carbon material so as to form into one body with the flexible carbon material, the ribbed flexible carbon materials being joined to both surfaces of a separator so that the respective top surfaces of the ribs contact with the both surfaces of the separator and the flow channels formed by the mold ribs in one of the ribbed flexible carbon materials are perpendicular to those in the another ribbed flexible carbon material, (2) the separator having an extended part which extends beyond the flexible carbon material and (3) a manifold material provided with a flow passage for supplying a reactant gas, which comprises a gas-impermeable and compact carbon material and has been joined to the extended part of the separator.

Concerning the electrode substrate for a fuel cell mentioned in the seventh and eighth places, a flexible graphite sheet may be interposed between the flexible carbon material or the ribbed flexible carbon material and the separator, and in such a case, it is desirable to produce the composite electrode substrate by joining the materials together while using an adhesive and then calcining the thus joined materials into one body as carbon, because excellent conductivity is obtained. In addition, a flexible graphite sheet or a layer of fluorocarbon resin may be interposed between the manifold material and the separator.

The present invention will be explained more in detail as follows:

In the present invention, a flexible carbon material which will be described in detail as follows is fundamentally used at least partially in the electrode substrate for a fuel cell which contacts the flow channels of the reactant gas.

The flexible carbon material used according to the present invention is obtained by carbonizing a composite material comprising carbon fibers of not less than 1 mm in mean length which have been treated at a temperature of not lower than 1000° C. and a binding agent, the carbon lumps derived from the binding agent being dispersed in the matrix of the carbon fibers and restraining a plurality of the carbon fibers. The carbon fibers are moreover slidably held one to another by means of the carbon lumps.

Figure 11:
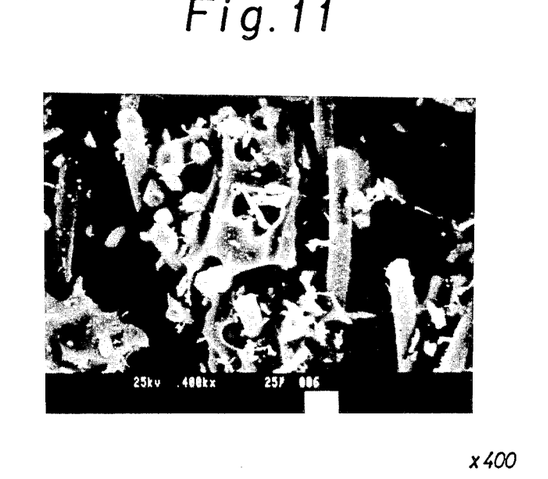
FIGS. 11 and 13 are microphotographs showing the microstructure of the flexible carbon material constituting the electrode substrate of the present invention (400 magnification in FIG. 11 and 300 magnification in FIG. 13)
Figure 12:
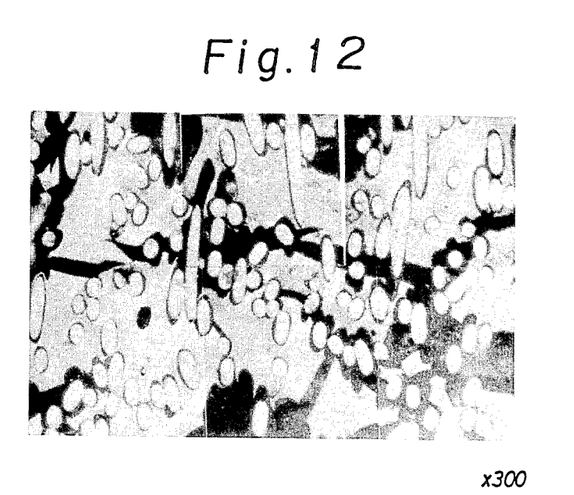
FIG. 12 is a polarizing microphotograph showing the above microstructure of the flexible carbon material (300 magnification).
Figure 13:
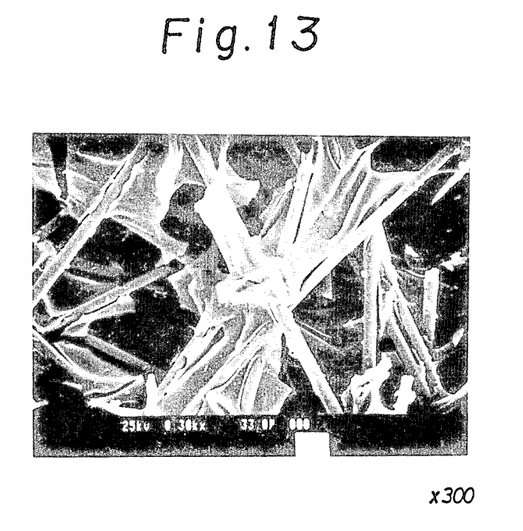

Although in the flexible carbon material used according to the present invention, almost all the carbon lumps derived from the binding agent are individually dispersed and restrain the carbon fibers, there are gaps between the carbon fibers and the carbon lumps in these restraining regions. That is, although almost all the carbon fibers are restrained by the carbon lumps, the carbon fibers are not chemically or physically joined to the carbon lumps. Accordingly, in the case where an external force is applied onto the flexible carbon material, the carbon fibers slide in the above-mentioned carbon lumps. This novel microstructure has been confirmed by electronmicroscope and polarizing microphotograph (as shown in FIGS. 11 to 13).

In the case where an external force is applied on the carbon material of the present invention, the carbon material shows a flexibility which is observed by the fact that an amount of displacement remains. The above-mentioned flexibility is represented by the ratio of the diameter (D) of curvature just before breakage when the flexible carbon is bent (referred to as the minimum diameter of curvature) to the thickness (d) of the carbon material, and the ratio, namely D/d is preferably not more than 200.

Although the flexible carbon material according to the present invention has the flexibility shown above, the other physical properties thereof are nearly the same as those of the conventional carbon fiber paper sheet (for instance, refer to U.S. Pat. No. 3,998,689) or are superior thereto. For example, the tensile strength of the flexible carbon material of the present invention is not less than 0.05 kgf/mm$^2$, the electric resistance thereof is not more than 900 mΩ.cm and the bulk density thereof is from 0.2 to 1.3 g/cm$^3$. In the flexible carbon material of the present invention, not less than 80% (in number) of the micropores have the pore diameter of from 10 to 400 μm. On the other hand, the conventional carbon fiber paper sheet does not show the flexibility shown above.

It is necessary that the mean length of the carbon fibers in the flexible carbon material according to the present invention is not less than 1 mm, preferably not less than 3 mm and more preferably not less than 6 mm. However, it is preferred that the maximum length of the carbon fibers according to the present invention is not more than 50 mm, because the thus prepared composite material becomes heterogeneous in the case where the mean length thereof is over 50 mm.

It is preferable that the diameter of the above-mentioned carbon fiber is from 4 to 25 μm.

The above-mentioned carbon fibers may be oriented at random two-dimensionally or three-dimensionally, and the ratio of the volume occupied by the carbon fibers in the flexible carbon material to the total volume of flexible carbon material is from 5 to 50%, preferably from 10 to 40%.

Although it is not necessary that the carbon lumps derived from the binding agent are in a spherical form, in the case where it is regarded as sphere, the diameter of the lumps is 2 to 200 times the diameter of the carbon fibers, preferably 3 to 100 times thereof, and the ratio of the volume occupied by the carbon lumps in the flexible carbon material to the total volume of the carbon material of the present invention is 5 to 70%, preferably 10 to 60%.

In the production of the flexible carbon material according to the present invention, a composite material comprising carbon fibers of not less than 1 mm in mean length and a binding agent is prepared at first. As the carbon fibers used according to the present invention, various fibers such as those of polyacrylonitriles, of rayons, of phenol resins, of isotropic pitches, of anisotropic pitches, etc. may be mentioned, and they are used after being treated at a temperature of not lower than 1000° C., preferably not lower than 1500° C., and more preferably not lower than 2000° C. under a reduced pressure and/or in an inert atmosphere.

The carbon fibers used according to the present invention are not less than 1 mm, preferably not less than 3 mm and more preferably 6 mm in mean length and are 4 to 25 μm in diameter.

As the binding agent, an organic substance having a carbonizing yield of not less than 10%, preferably not less than 20%, for instance, one or more kinds of phenol resin, furan resin, pitch of petroleum series or coal series, polyvinyl alcohol, polyvinyl chloride, polyacrylonitrile, rayon, polymer of siloxane series, etc. are used.

In order to prepare a composite material comprising the above-mentioned carbon fibers and the binding agent, various methods may be used. For instance, after impregnating a carbon fiber matrix (for instance manufactured by wet process or dry process to be a sheet of paper) with a solution prepared by dissolving the binding agent in a solvent, the solvent is removed from the sheet of carbon fiber paper, or the binding agent is uniformly added to the carbon fiber matrix by pouring the powdery form, sheet-form or pellet-form binding agent into the carbon fiber matrix while heating. Or, the binding agent may be preliminarily applied on the surface of the carbon fibers. For instance, the carbon fiber matrix may be prepared from the thus coated carbon fibers and then the binding agent may be added to the thus prepared carbon fiber matrix to obtain the composite material. In such a case, when the surface of the carbon fibers are coated with a high polymeric substance of a low carbonizing yield, a favorable result is obtained because of the formation of the space between the carbon fibers and the carbon lumps derived from the binding agent during the subsequent steps of thermal molding under a pressure and calcining. For instance, after mixing the fibrous or granular high polymeric substance having the low carbonizing yield with the carbon fibers and preparing the carbon fiber matrix therefrom by paper-manufacturing method, the binding material is added to the thus prepared carbon fiber matrix, thereby preparing the composite material. As such a high polymeric substance, polyvinyl alcohol may be mentioned. In addition, one or more kinds of carbon black, graphite particles or carbon particles may be used as an aggregate together with the carbon fibers.

Further, in the case where the carbon fibers sheafed by a sheafing agent are used as they are, the desired physical property can not be obtained even by calcining the material after molding.

It has been found that, in such a case, a favorable product is available by using the carbon fibers from which the sheafing agent has been removed preliminarily by washing the carbon fibers with a solvent.

In addition, since there may be cases where the sheafing agent still remains on the carbon fibers after only washing them with a solvent, it is preferable to treat the carbon fibers at a high temperature after washing them with a solvent and thereby make the surface of the carbon fibers inactive.

The composite material prepared in the above-mentioned manner is thermally molded under the conditions of a molding temperature of not lower than 100° C., a molding pressure of not less than 2 kgf/cm²G and a pressure holding time of not less than one min. Thereafter, the thus molded article is wholly carbonized by calcining under a reduced pressure and/or in an inert atmosphere according to the conventional method. The temperature of calcination is not lower than 850° C., preferably not lower than about 1500° C. and most preferably not lower than about 2000° C.

In addition, in the process for producing the electrode substrate of our invention, the raw material before calcination for preparing the flexible carbon material may be used directly for the production of the electrode substrate.

In the flexible carbon material thus obtained according to the present invention, the carbon lumps derived from the binding agent and the carbon fibers are not completely stick to each other and the carbon fibers can slide within the carbon lump derived from the binding agent because of the presence of a space between the binding part of the two components. Consequently, the flexible carbon material according to the present invention has a flexibility which has never been considered in the conventional carbon fiber paper, etc. Further, the other specific properties of the flexible carbon material according to the present invention are also not at all inferior to those of the conventional carbon fiber paper. The specific properties of the flexible carbon material according to the present invention are compared with those of the conventional carbon paper (refer to U.S. Pat. No. 3,998,689) in Table 1.

As is clearly seen in Table 1, the conventional carbon fiber paper scarcely shows any flexibility (as that defined above), and on the other hand, the flexible carbon material of the present invention is excellent in flexibility, and the other specific properties are retained in the same level. The reason why the conventional carbon fiber paper does not show flexibility is considered to be due to the fact that the carbon lumps derived from the binding agent adheres closely to the carbon fibers.

TABLE 1

|  | Flexible carbon fiber paper according to the present invention | Conventional carbon fiber paper according to U.S. Pat. No. 3,998,689 |
|---|---|---|
| Flexibility (D/d)(cm/cm) | 30-200 | 500-1000 |
| Apparent density (g/cc) | 0.3-1.2 | 0.3-0.8 |
| Gas-permeability (ml/cm² · hr · mmAq.) | $1-10^5$ | $10^2-10^5$ |
| Pore diameter (μm) | 10-200 | 10-200 |
| Linear thermal expansion coefficient (1/°C.) | $3.4 \times 10^{-6}$ | $4.5 \times 10^{-6}$ |
| Resistance to hot water | very large | very large |
| Electrical resistance (mΩ · cm) | 20-900 | 20-900 |
| Tensile strength (kgf/mm²) | 0.1-0.3 | 0.4-0.7 |
| Tensile elastic modulus (kgf/mm²) | 10-30 | 60-110 |

Namely, hitherto the improvement of the mechanical strength and the reduction of the electric resistance have been required for the carbon fiber paper and accordingly, it has been desired that the carbon lumps and the carbon fibers are mutually adhered closely.

The flexible carbon material according to the present invention has the same usefullness in the same usage of the conventional carbon materials and in addition, it is particularly useful in the fields wherein flexibility is requested together with heat-resistance, corrosion-resistance, conductivity and mechanical strength. The respective uses for various electrode substrate will be clearly understandable for the person skilled in the art.

Figure 1:
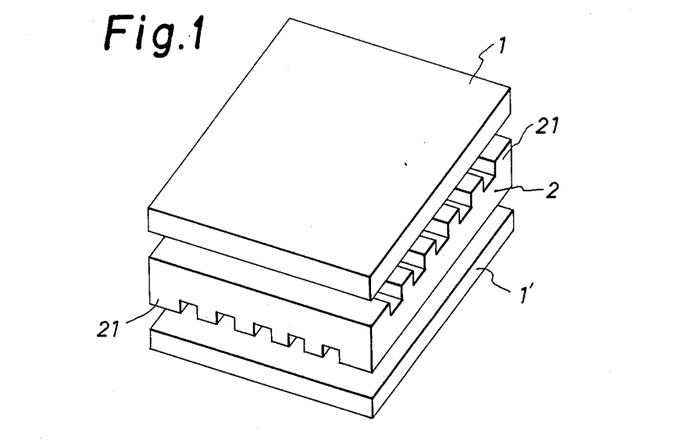
FIGS. 1 to 4 respectively show the electrode substrates for a fuel cell of the first to fourth embodiments of the present invention, FIGS. 5 to 7 respectively show the electrode substrate for a fuel cell of the fifth embodiment of the present invention, FIGS. 8 to 10 respectively show the composite electrode substrate for a fuel cell of the fourth to sixth embodiments of the present inventions.

The electrode substrate for a fuel cell according to the present invention is characterized in that the above-mentioned flexible carbon material is used at least as a part of the electrode substrate which contacts with the flow channels of a reactant gas. As the actual electrode substrate, there are various modes of embodiment, and some of them will be explained while referring to the attached drawings as follows:

A first embodiment of the electrode substrate for a fuel cell of the present invention is shown in FIG. 1 of the attached drawings.

In the electrode substrate for a fuel cell shown in FIG. 1, the flexible carbon materials 1 and 1' as the gas-diffusion part have been stacked on both surfaces of the separator 2 which is provided with ribs 21.

The gas-diffusion part 1 (electrode substrate) comprising the flexible carbon material is porous and carbonaceous, and it is preferable that the gas-diffusion part shows the properties of a mean bulk density of from 0.3 to 0.9 g/cm$^3$, a gas-permeability of not less than 200 ml/cm$^2$.hour.mmAq and an electric resistance of not more than 200 mΩ.cm after having been calcined at a temperature of not lower than 1000° C. under a reduced pressure and/or in an inert atmosphere.

It is preferable that the separator shows the properties of a mean bulk density of not less than 1.4 g/cm$^3$, a gas-permeability of not more than 10$^{-6}$ ml/cm$^2$.hour.mmAq and an electric resistance of not more than 10 mΩ.cm and is not more than 2 mm in thickness excluding the rib.

The embodiment of the electrode substrate shown in FIG. 1 is available by interposing the ribbed separator between the two flexible carbon materials prepared as above and simply stacking the three materials.

As the material used in the present invention for the separator, a compact carbon plate of a calcining shrinkage of not more than 0.2% after calcining thereof at 2000° C. under a reduced pressure and/or in an inert atmosphere is preferable, and it is used after providing the rib thereon by a suitable means in the case of using the ribbed separator.

In the above-mentioned embodiment according to the present invention, since the carbon material of the electrode is flexible, the handling loss is small in the case, for instance, wherein the carbon material is subjected to water-repellent treatment by TEFLON® dispersion and the catalyst layer is formed thereon up to prepare a fuel cell by stacking the thus produced electrode substrate, and since the contact between the flexible carbon material and the ribbed separator is closely maintained, there is an effect of reducing the contact resistance up to, for instance, 30 mΩ.cm$^2$ from 80 mΩ.cm$^2$ in the case of the conventional joining.

Figure 2:
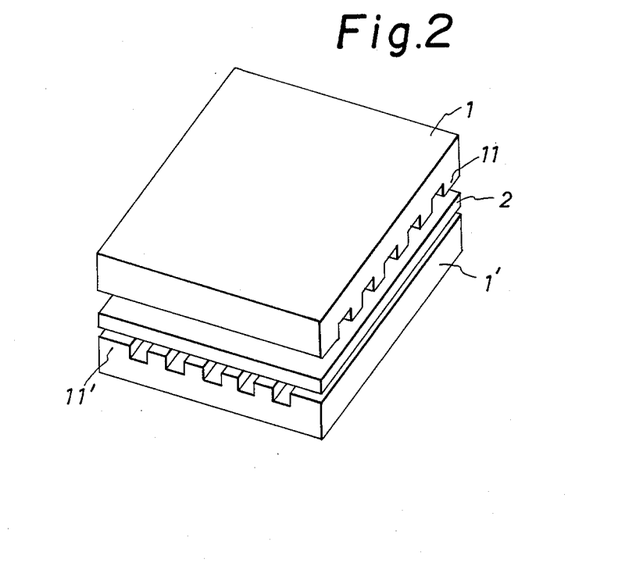

The second embodiment of the electrode substrate for a fuel cell of the present invention is shown in FIG. 2.

In the second embodiment of the electrode substrate shown in FIG. 2, the ribs 11 and 11' have been respectively formed by mechanical means onto the flexible carbon materials 1 and 1' as the electrode substrate, and the stacked electrode substrate is obtained by interposing the plate-form separator 2 between the ribs of the two electrode substrates and simply stacking the materials. In addition, in the present specification, the simple word "separator" designates a separator having a flat plate-form.

The physical properties of the respective parts in the electrode substrate of the second embodiment shown in FIG. 2 are the same as those of the first embodiment shown in FIG. 1.

The method for producing the electrode substrate shown in the embodiment in FIG. 2 is a little different from that in the case of the first embodiment shown in FIG. 1, and the flexible carbon material is ribbed preliminarily before joining by using a suitable mechanical means.

In the case of using the electrode substrate of the second embodiment shown in FIG. 2, the same effect is obtained as that described in the first embodiment shown in FIG. 1.

Figure 3:
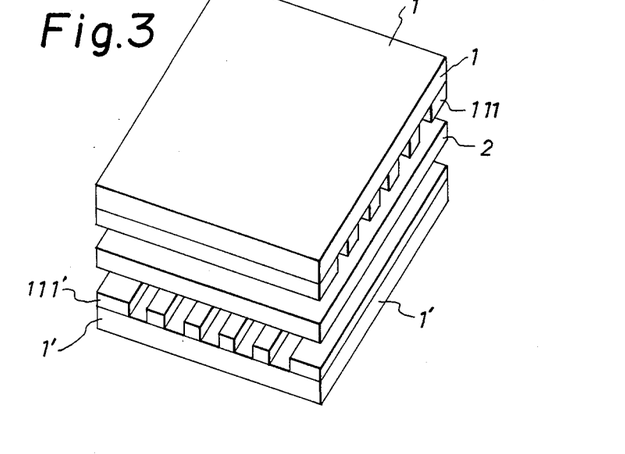

In the next place, the third embodiment of the electrode substrate for a fuel cell of the present invention is shown in FIG. 3.

Although the construction and shape of the electrode substrate of the third embodiment shown in FIG. 3 are nearly the same as those of the second embodiment shown in FIG. 2, in the third embodiment shown in FIG. 3, the ribbed flexible carbon materials 1 and 1' prepared by molding a ribbed material 111 and 111' on the flexible carbon materials 1 and 1' so that the former is formed into one body with the flexible carbon materials 1 and 1' and thus are used as the electrode substrates 1 and 1'.

The physical properties of the respective parts of the electrode substrate of the third embodiment shown in FIG. 3 are the same as those in the embodiments shown in FIGS. 1 and 2.

Further, also the method for production of the electrode substrate of the third embodiment shown in FIG. 3 resembles to that of the embodiments shown in FIGS. 1 and 2. However, the mold rib in the ribbed flexible carbon material shown in FIG. 3 has been produced by (1) scattering a raw material for a mold substrate comprising (i) carbon fibers of length of 0.1 to 1.0 mm obtained by calcining at a temperature of not lower than 800° C., most preferably at a temperature of not lower than 2000° C. under a reduced pressure and/or in an inert atmosphere and (ii) particles of the binding agent on the flexible carbon materials which has not been yet calcined, (2) supplying the thus treated flexible carbon material into a metal mold of the prescribed shape and (3) subjecting the thus supplied material to thermal press-molding, thereby forming the mold rib.

In the case where the electrode substrate of the third embodiment shown in FIG. 3 is used, in addition to the same effect as in the cases of using the embodiments shown in FIGS. 1 and 2, there is an additional effect that the large deformation does not appear due to the absorption of the shrinkage of the mold rib at the time of calcination because of the flexibility of the flexible carbon material of the electrode substrate of the present invention as compared to the conventional electrode substrate provided with the mold rib.

Figure 4:
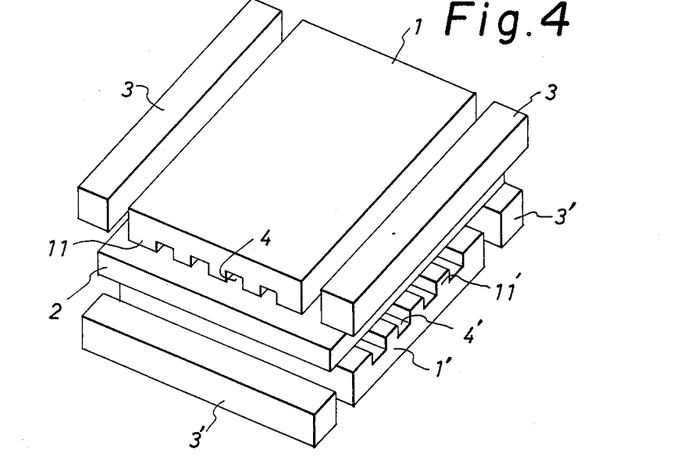

The fourth embodiment of the electrode substrate for a fuel cell of the present invention is shown in FIG. 4.

The composite electrode substrate for a fuel cell of the present invention shown in the embodiment of FIG. 4 has a construction formed by (1) the two electrode substrates 1 and 1' comprising the flexible carbon materials having a plurality of parallel flow channels of a reactant gas 4 and 4', (2) the separator 2 interposed between the two electrode substrates and (3) the peripheral sealers 3 and 3' each of which is a gas impermeable and compact carbon material and disposed on the extended part of the separator which extends beyond the periphery of the electrode substrate, which is parallel to the flow channels 4 and 4' of the electrode substrate.

The separator 2 is larger in surface area than the electrode substrates 1 and 1' and has been extended, as is shown in FIG. 4, beyond the periphery of the electrode substrate along the periphery which is parallel to the flow channels 4 and 4' of one of the electrode substrates (the outer edge of the extended part coincides with the outer edge of the another electrode facing to the electrode substrate while holding the separator), and the peripheral sealers 3 and 3' have been joined to the above-mentioned extended part. Further, as the electrode substrates 1 and 1' in the above-mentioned case, the ribbed electrode substrate in the above-mentioned embodiment in FIG. 2 or 3 (formed by mechanical ribbing or mold ribbing) may be used.

It is preferable that the peripheral sealer is not less than 1.4 g/cm$^3$ in mean bulk density and not more than 10$^{-4}$ ml/cm$^2$.hour.mmAq in gas-permeability.

In order to produce the composite electrode substrate provided with the peripheral sealers for a fuel cell of the present invention of the fourth embodiment shown in FIG. 4, the ribbed flexible carbon material (before or after calcination thereof) and the separator material are joined together under the predetermined conditions while using an adhesive in the case where the ribbed flexible carbon material has been calcined or while using the adhesive optionally in the case where the ribbed carbon material has not yet been calcined, and further, (1) after calcinating the thus joined materials at a temperature of not lower than about 1000° C. under a reduced pressure and/or in an inert atmosphere, the peripheral sealer is joined to the thus calcined materials, or (2) except for the case where the peripheral sealer is joined to the separator material by a layer of a fluorocarbon resin, the joined materials may be calcined after joining the peripheral sealer without the calcination before joining the peripheral sealer. As the method for joining the peripheral sealer, the peripheral sealer is joined to the extended part of the separator which extends beyond the periphery of the electrode substrate parallel to the flow channels of a reactant gas therein. Thus the electrode substrate of FIG. 4 is made to be one body together with the separator by calcination, thereby forming the composite electrode substrate.

As the peripheral sealer material, the compact carbon material of a calcining shrinkage of not more than 0.2% when calcinated at 2000° C. under a reduced pressure and/or in an inert atmosphere is preferable.

At the above-mentioned time, a flexible graphite sheet may be interposed respectively between the ribbed flexible carbon material and the separator material and between the peripheral sealer material and the separator material thereby joining the each materials together.

As the adhesive and the joining conditions, those generally used in joining the carbon materials together may be utilized.

In addition, in the case where a particularly large composite electrode substrate is produced, as has been described above, a method can be adopted wherein the separator material and the flexible carbon material are joined together while interposing a flexible graphite sheet between them and using an adhesive between the respective materials.

The flexible graphite sheet prepared by compressing expanded graphite particles and used according to the present invention is prepared by compressing the expanded graphite particles obtained by subjecting graphite particles of not more than 5 mm in diameter to acid-treatment and further heating the thus treated graphite particles, and it is preferable that the flexible graphite sheet is not more than 1 mm in thickness, 1.0 to 1.5 g/cm$^3$ in a bulk density, not more than $0.35 \times 10^{-2}$ cm$^2$/kgf in a rate of compression strain (namely, the rate of strain under the compression load of 1 kgf/cm$^2$) and has a flexibility of not being broken when being bent to 20 mm in the radius of curvature. As a favorable example of the flexible graphite sheet commercialized, GRAFOIL ® (made by U.C.C.) may be exemplified.

As the adhesive used on the joining surfaces when the above-mentioned electrode substrate material and the peripheral sealer material are joined to the separator material via the flexible graphite sheet, the adhesive generally used for joining the ordinary carbon materials together may be mentioned, however, particularly it is preferable to use a thermosetting resin selected from phenol resins, epoxy resins and furan resins for that purpose.

Although the thickness of the layer of the adhesive is not particularly restricted, it is preferable to apply the adhesive uniformly in a thickness of not more than 0.5 mm.

Furthermore, the joining by the above-mentioned adhesive can be carried out under the conditions of a pressing temperature of 100° to 180° C., a pressure of 1.5 to 50 kgf/cm$^2$G and a pressure holding time of 1 to 120 min.

After joining the electrode substrate with the separator material as above, the thus joined materials are calcined at a temperature of not lower than about 800° C. under a reduced pressure and/or in an inert atmosphere to obtain the composite electrode substrate of the present invention.

Further, it may be possible to join the peripheral sealer and the separator together by interposing a layer of a fluorocarbon resin between them.

Figure 8:
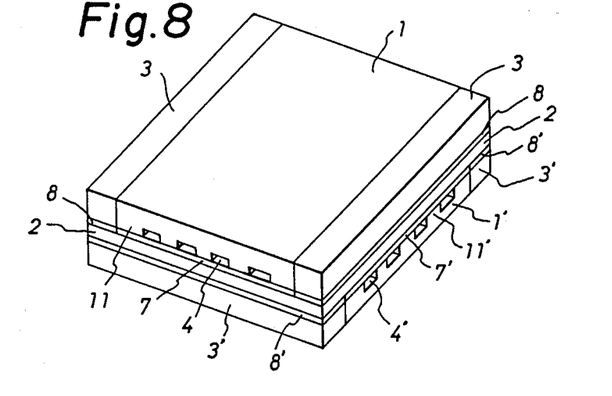

FIG. 8 shows the above-mentioned another example of the composite electrode substrate provided with the peripheral sealer in the fourth embodiment of the present invention. The electrode substrate shown in FIG. 8 has a construction formed by:

(1) the two flexible carbon materials 1 and 1' on one side of each of which a plurality of mutually parallel flow channels of a reactant gas 4 and 4' have been provided by mechanical ribbing, the ribbed flexible carbon materials 1 and 1' being joined to both surfaces of a separator 2 via flexible graphite sheets 7 and 7' so that the respective top surfaces of the ribs 11 and 11' contact with the flexible graphite sheets 7 and 7' and the flow channels 4 in the ribbed flexible carbon material 1 are perpendicular to the flow channels 4' in the ribbed flexible carbon material 1', (2) the separator 2 having extended parts which extend beyond peripheries of the flexible carbon materials 1 and 1', which are parallel to the flow channels of a reactant gas 4 and 4' therein and (3) peripheral sealers 3 and 3' joined to the extended parts of the separator 2 via flexible graphite sheets 8 and 8' or layers of a fluorocarbon resin 8 and 8'.

Figure 9:
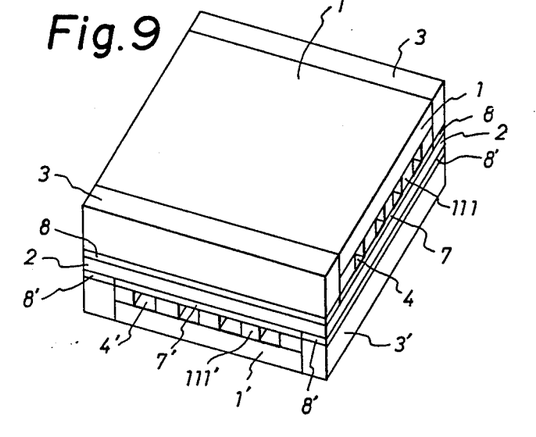

Further, FIG. 9 shows the above-mentioned one example of the electrode substrate provided with the peripheral sealer in the fifth embodiment of the present invention.

The electrode substrate shown in FIG. 9 has a construction formed by (1) two ribbed flexible carbon materials 1 and 1' obtained by molding mold ribs 111 and 111' on said flexible carbon material 1 and 1' so as to form into one body with said flexible carbon material 1 and 1', said ribbed flexible carbon materials being joined to both surfaces of a separator 2 via flexible graphite sheets 7 and 7' so that the respective top surfaces of said ribs 111 and 111' contact with the flexible graphite sheets 7 and 7' and flow channels of a reactant gas 4 formed by said mold ribs 111 in the ribbed flexible carbon material 1 are perpendicular to the flow channels 4' in the ribbed flexible carbon material 1', (2) the separator 2 having extended parts which extend beyond peripheries of the flexible carbon materials 1 and 1' which are parallel to the flow channels of a reactant as 4 and 4' therein, and (3) peripheral sealers 3 and 3' joined to the extended parts of the separator 2 via flexible graphite sheets 8 and 8' or layers of a fluorocarbon resin 8 and 8'.

The fluorocarbon resin which can be used in the present invention is generally a fluorocarbon resin of a melting point of not lower than 200° C., and although it is not particularly limited, for instance, tetrafluoroethylene resin (abbreviated to as PTFE, a melting point of 327° C. and a thermally deforming temperature of 121° C. under a pressure of 4.6 kgf/cm$^2$G), the copolymer resin of tetrafluoroethylene and hexafluoropropylene (abbreviated to as FEP, a melting point of from 250° to 280° C., a thermally deforming temperature of 72° C. under a pressure of 4.6 kgf/cm$^2$G), fluorinated alkoxyethylene resin (abbreviated to as PFA, a melting point of from 300° to 310° C. and a thermally deforming temperature of 75° C. under a pressure of 4.6 kgf/cm$^2$G), fluorinated copolymer resin of ethylene and propylene (abbreviated to as TFP, a melting point of from 290° to 300° C.), etc. may be mentioned, the above-mentioned fluorocarbon resins being commercialized. In the above fluorocarbon resins, PTFE resin is most preferable for producing the product of the present invention.

In the case of using the above-mentioned fluorocarbon resin, it is used, for instance, as a sheet of about 50 μm in thickness or as an dispersion containing about 60% by weight of the resin. A small amount of a surfactant may be added to the above-mentioned dispersion.

In the case of using the above-mentioned fluorocarbon resin, the dispersion of the fluorocarbon resin is applied on the joining surfaces of the extended part of the separator material and the peripheral sealer material which is to be joined to the extended part of the separator material, or the sheet of the fluorocarbon resin is interposed between the above-mentioned two materials, and then the thus composite materials are joined together by melt-adhesion of the resin under a pressure of not less than 2 kgf/cm$^2$G at a temperature of not lower than the temperature of lower by 50° C. than the melting point of the fluorocarbon resin.

In the case of using the above-mentioned composite electrode substrate of the fourth embodiment shown respectively in FIGS. 4 and 8 and the fifth embodiment shown in FIG. 9 according to the present invention, although the above-mentioned effects can be obtained of course, since the peripheral sealer has been joined and formed into one body with the separator material, it is not necessary to provide a special peripheral sealer which is necessitated in the ordinary fuel cell for preventing the leakage of the reactant gas to the side of the fuel cell, and the use of such a composite electrode substrate exhibits the following effect.

Namely, since the peripheral sealers have been evenly disposed and joined around the thin plate-form electrode substrate while holding the separator alternately in both sides, there is a reinforcing effect due to the above-mentioned structure, and as a result, the thus formed electrode substrate is excellent in the handling property at the time of producing the fuel cell.

In addition, since in the composite electrode substrate of the present invention, the electrode substrate has the flexibility in contrast to the conventional electrode substrate, the thus composite electrode substrate can be obtained without causing cracks, exfoliation and warps of the materials by calcining after joining a precursor thereof while not using (1) the flexible graphite sheet between the electrode substrate and the separator or (2) the flexible graphite sheet or the layer of fluorocarbon resin between the peripheral sealer and the separator. As a result, the thickness of the thus produced composite electrode substrate can be made thinner than that of the conventional composite electrode substrate. Further, in the case of suitably interposing the flexible graphite sheet or the layer of fluorocarbon resin between the above-mentioned materials, the substrate of larger size than the conventional product is possibly produced without causing the problems of cracks, exfoliation, warps, etc.

In addition, in the composite electrode substrate formed by joining the materials by the flexible graphite sheet or the layer of the fluorocarbon resin into one body is excellent in resistance to phosphoric acid, and is particularly useful as the composite electrode substrate for a fuel cell of phosphoric acid-type.

Furthermore, in the case where all of the peripheral sealers and the separator have been joined together via the flexible graphite sheet or the layer of the fluorocarbon resin, the amount of gas-leakage to outside through the peripheral sealer including the thus joined parts depends mainly on diffusion and is not so much affected by the pressure, however, it is preferable that an amount of gas-leakage is not more than $10^{-2}$ ml/cm.hour.mmAq when an amount of gas-leakage per unit time per the peripheral length of the joined part under a differential pressure of 500 mmAq is represented by [amount of gas-leakage/(side length of the periphery)·(differential pressure)].

Figure 5:
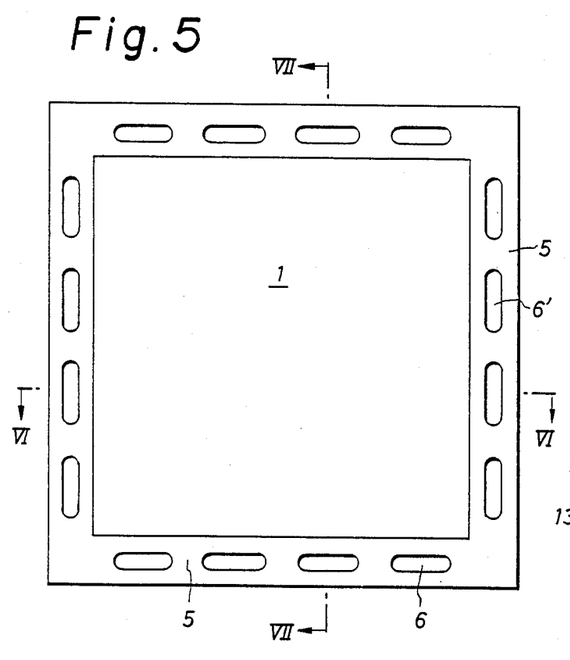
Figure 6:
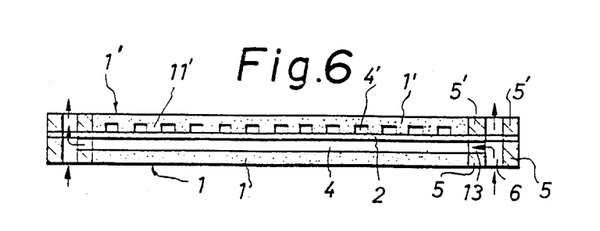
Figure 7:
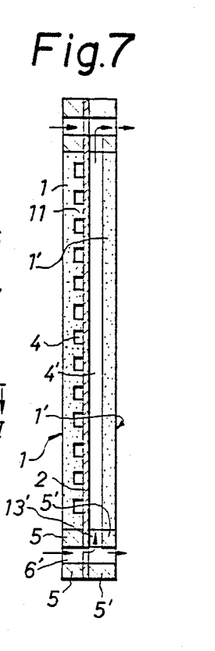

In the next place, the composite electrode substrate provided with the manifold for a fuel cell of the sixth embodiment according to the present invention is shown in FIGS. 5 to 7.

FIG. 5 is a ground plan of the composite electrode substrate of the present invention, and FIGS. 6 and 7 are the respective cross-sectional figures corresponding to VI—VI and VII—VII of FIG. 5.

The composite electrode substrate provided with the manifold according to the present invention has a structure comprising the two electrode substrates 1 and 1' consisting of the flexible carbon materials having the flow channels of a reactant gas 4 and 4', the separator 2 disposed between the above-mentioned two electrode substrate and the manifolds 5 and 5' each of which contacts with the periphery of the above-mentioned electrode substrates.

The separator 2 is larger in surface area than the electrode substrates 1 and 1' and as is shown in FIG. 5, the separator is extended beyond the periphery of the electrode substrate, and the manifolds 5 and 5' have been joined to the thus extended part of the separator 2.

In the manifolds 5 and 5', the flow passages 6 and 6' for supplying a reactant gas have been provided while penetrating the manifolds including the separator.

The above-mentioned flow passage 6 for supplying a reactant gas has been connected to the flow channel 4 of a reactant gas provided in the electrode substrate 1 via a flow passage 13 of a reactant gas disposed in the manifold 5, or has been directly connected to the flow channel 4 of a reactant gas disposed in the electrode substrate, and the other electrode substrate 1' consisting of the gas-diffusion part 1' and the rib 11' has been sealed by the manifold 5' (refer to FIG. 6).

On the other hand, the flow passage 6' for supplying a reactant gas has been connected to the flow channel 4' of a reactant gas provided in the electrode substrate 1' via a flow passage 13' of a reactant gas provided in the manifold 5', or has been directly connected to the flow channel 4' of a reactant gas provided in the electrode substrate 1' and the other electrode substrate 1 has been sealed by the manifold 5 (refer to FIG. 7).

The flow direction of the reactant gas is shown in FIGS. 6 and 7 by the arrow mark.

As the electrode substrate in this case, any one of the ribbed flexible carbon materials in the embodiments shown in FIG. 2 and also in FIG. 3 may be used.

It is preferable that the above-mentioned manifold is not less than 1.4 g/cm$^3$ in mean bulk density and not more than $10^{-4}$ ml/cm$^2$.hour.mmAq in gas-permeability.

In order to produce the composite electrode substrate provided with the manifold for a fuel cell in the sixth embodiment according to the present invention, the electrode substrate material comprising the ribbed flexible carbon material (before or after calcination thereof) and the separator material are joined together while using an adhesive in the case where the ribbed flexible carbon material has been already calcined or while optionally using the adhesive in the case where the ribbed flexible carbon material has not yet been calcined. Thereafter, (1) after calcining the thus joined materials at a temperature of not lower than about 1000° C. under a reduced pressure and/or in an inert atmosphere in this stage, the manifold material is joined to the thus calcined materials or (2) except for the case where the manifold material is joined to the separator by a layer of the fluorocarbon resin, the manifold material is joined to the separator without calcination thereof and the thus joined materials may be calcined finally. The above-mentioned joining of the manifold material is carried out by joining the manifold material to the extended part of the separator material which has been extended beyond the electrode substrate material.

Further, by the above-mentioned calcination, also the electrode substrate shown in FIGS. 5 to 7 forms the composite electrode substrate while coming into one body with the separator.

In addition, the holes 6 and 6' which become the flow passage for supplying a reactant gas in the manifold may be made in the optional stage of the above-mentioned step, for instance, before or after joining each of the manifold materials to the separator material by a suitable means. Of course, it is desirable that the flow passages 13 and 13' which connect the above-mentioned holes 6 and 6' with the flow channels 4 and 4' of a reactant gas in the electrode substrate material are made suitable before joining the manifold material to the separator material.

As the manifold material, a compact carbon material which shows the calcining shrinkage of not more than 0.2% when it is calcined at 2000° C. under a reduced pressure and/or in an inert atmosphere is desirable.

Also in the above-mentioned embodiment according to the present invention, the joining of the materials may be carried out by interposing (1) a flexible graphite sheet between the ribbed flexible carbon material and the separator or (2) the flexible graphite sheet or the layer of the fluorocarbon resin between the manifold material and the separator. The conditions for the joining are the same as those described already.

Figure 10:
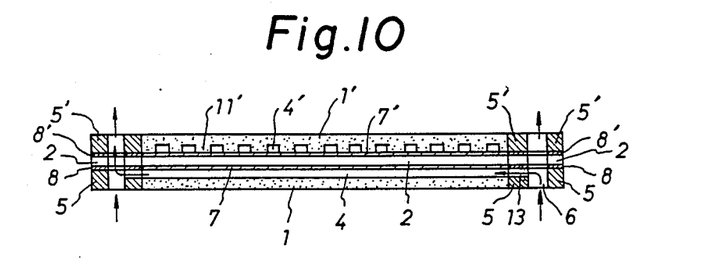

FIG. 10 shows the above-mentioned another example of the composite electrode substrate provided with the manifold in the six embodiment of the present invention. The electrode substrate shown in FIG. 10 has a construction formed by (1) two flexible carbon materials 1 and 1' on one side of each of which a plurality of mutually parallel flow channels 4 and 4' have been provided by mechanical ribbing, the ribbed flexible carbon materials 1 and 1' being joined on both surfaces of a separator 2 via flexible graphite sheets 7 and 7' so that the respective top surfaces of said ribs 11 (not shown in FIG. 10) and 11' contact with the flexible graphite sheets 7 and 7' and flow channels of a reactant gas 4 in one of the ribbed flexible carbon material 1 are perpendicular to those 4' in another ribbed flexible carbon material 1', (2) the separator 2 having extended parts which extend beyond the flexible carbon materials 1 and 1' and (3) manifold materials 5 and 5' provided with a flow passage 6 for supplying a reactant gas, joined to the extended parts of the separator 2 via flexible graphite sheets 8 and 8' or layers of a fluorocarbon resin 8 and 8'.

Furthermore, in the case wherein the composite electrode substrate for a fuel cell of the present invention, all the manifold and the separator have been joined together via the flexible graphite sheet or the layer of the fluorocarbon resin, the amount of gas-leakage to outside through the manifold part including the joining part is preferably not more than $10^{-2}$ ml/cm.hour.mmAq when an amount of gas-leakage per the peripheral length of the joining part per unit time under a predetermined differential pressure is represented by the relationship of [amount of gas-leakage/(side length of the periphery)·(differential pressure)].

The composite electrode substrate for a fuel cell according to the sxith embodiment respectively shown in FIGS. 5 to 7 and 10 of the present invention exhibits the already described effects, and since the manifold has been formed into one body with the substrate, the supply and discharge of the necessary gas can be carried out through the manifold parts of the respective composite materials of the stacked fuel cell as the whole cell when the reactant gas and the like is once introduced into the manifold. Accordingly, the above-mentioned composite electrode substrate exhibits another effect that it is not necessary to provide the outer manifold for supply and discharge of the reactant gas and the like, which has been necessitated in the ordinary fuel cell.

Since in the electrode substrate for a fuel cell of the present invention, which has been precisely described as above, at least a part of the electrode substrate which contacts with the flow channel of a reactant gas has been composed of a flexible carbon material having a particular microstructure, and accordingly the above-mentioned electrode substrate exhibits an effect that the electrode substrate can be produced without causing cracks, exfoliation and warps at the time of joining it to the separator.

The present invention will be explained more in detail while referring to the non-limitative examples as follows.

EXAMPLE 1 and COMPARATIVE EXAMPLE 1

Seven parts by weight of carbon fibers (made by KUREHA KAGAKU KOGYO Co., Ltd., under the trade name of C206S, 6 mm in length and from 14 to 16 μm in diameter, and produced by calcining isotropic pitch fibers at 2000° C.) and one part by weight of polyvinyl alcohol fibers (made by KURARE Co., Ltd., under the registered trade name of KURARE-VINYLON VBP 105-2, 3 mm in length) were dispersed in water and manufactured into sheets of paper of a conventional paper machine and then dried. After impregnating the thus manufactured sheet of carbon fiber paper with a 20% by weight solution of a phenol resin dissolved in methanol, the solvent was removed from the sheet of carbon fiber paper by drying thereof. After thermally molding the thus treated sheet of carbon fiber paper in a prescribed metal mold at 130° C. under a pressure of 10 kgf/cm²G for 20 min, the thus molded material was calcined at 2000° C. under a reduced pressure of several Torr and in a nitrogen atmosphere to obtain a thin plate-like electrode substrate of 0.3 mm in thickness.

For comparison, a similar product of a thin plate form was prepared while using another carbon fibers (made by KUREHA KAGAKU KOGYO Co., Ltd. under the trade name of C106S, with a length of 6 mm and a diameter of from 14 to 16 μm, those prepared by calcining isotropic pitch at 850° C.).

The physical properties of the thus obtained products are shown in Table 2.

TABLE 2

| Physical property | Example 1 | Comparative Example 1 |
|---|---|---|
| Flexibility (D/d)(cm/cm) | 35 | >500 |
| Bulk density (g/cm³) | 0.4 | 0.36 |
| Pore diameter (μm) | 10-180 | 10-200 |
| Resistance (mΩ · cm) | 220 | 200 |
| Contact resistance with the ribbed separator (mΩ · cm²) | 30 | 80 |

Note:
In the case of subjecting the each products to "TEFLON ®"-water repellent treatment and catalyst treatment, the product of Example 1 could be handled extremely easily giving a favorable result, however, in the same treatments, the product of Comparative Example 1 formed the edge-cracking in the rate of 10%.

EXAMPLE 2 and COMPARATIVE EXAMPLE 2

After dispersing the same carbon fibers and polyvinyl alcohol fibers as in Example 1 into water in the same weight ratio and manufacturing the carbon fiber paper sheet by using the ordinary paper machine, the thus obtained wet carbon fiber paper sheet was dried.

After impregnating the dried carbon fiber paper sheets with a 20% methanolic solution of a phenol resin, the solvent was removed from the paper sheets by drying thereof. Thereafter, the thus impregnated carbon fiber paper sheets were thermally molded in a prescribed metal mold at 130° C. under a pressure of 10 kgf/cm²G for 20 min, and then calcined at 2000° C. under a reduced pressure of several Torr and in a nitrogen atmosphere to obtain an electrode substrate of a thick plate form of 3 mm in thickness.

The thus obtained product was ribbed by a mechanical means to obtain a ribbed electrode substrate of 2 mm in the total thickness and 1.5 mm in the thickness of the rib.

In addition, the mechanical ribbing can be carried out before calcining the material at 2000° C.

For comparison, a similar product was prepared while using C 106 S carbon fibers in Comparative Example 2.

The physical properties of the thus obtained products are shown in Table 3.

TABLE 3

| Physical property | Example 2 | Comparative Example 2 |
|---|---|---|
| Flexibility (D/d)(cm/cm) | 35 | >500 |
| Bulk density (g/cm³) | 0.4 | 0.36 |
| Pore diameter (μm) | 10-180 | 10-200 |
| Resistance (mΩ · cm) | 200 | 180 |
| Contact resistance with the separator (mΩ · cm²) | 30 | 80 |

Notes:
In the case of subjecting the each products "TEFLON ®"-water repellent treatment and catalyst treatment, the product of Example 2 could be handled extremely easily giving a favorable result, however, in the same treatments, the product of Comparative Example 2 formed the edge-cracking in the rate of 10%.

EXAMPLE 3 and COMPARATIVE EXAMPLE 3

After dispersing the same carbon fibers and polyvinyl alcohol fibers as in Example 1 into water in the same weight ratio and manufacturing the carbon fiber paper sheet by using the ordinary paper machine, the thus obtained carbon fiber paper sheet was dried.

After impregnating the dried carbon fiber paper sheets with a 20% methanolic solution of a phenol resin, the solvent was removed from the paper sheet by drying thereof. The thickness of the carbon paper sheet impregnated with the phenol resin was 0.4 mm.

Separately, after blending 35% by weight of short carbon fibers (made by KUREHA KAGAKU KOGYO Co., Ltd. under the trade name of M-204 S, with the mean diameter of 14 μm and the mean length of 400 μm), 30% by weight of a phenol resin (made by ASAHI YUKIZAI Co., Ltd. under the trade name of RM-210) and 30% by weight of polyvinyl alcohol particles (made by NIHON GOSEI KAGAKU Co., Ltd. with the mean diameter of 180 μm), the blend was supplied into a prescribed metal mold and molded under the conditions of the molding temperature of 135° C., the molding pressure of 35 kgf/cm²G and the pressure holding time of 20 min to obtain a sheet of 1.5 mm in thickness.

After joining the thus molded sheet and the above-mentioned carbon paper sheet impregnated with the phenol resin together by an adhesive, the molded sheet side of the thus joined materials was subjected to mechanical ribbing. Thereafter, the thus treated material was calcined at 2000° C. under a reduced pressure of several Torr and is a nitrogen atmosphere to produce a ribbed electrode substrate of 2 mm in width of the rib, 1.5 mm in thickness of the rib and 1.85 mm in the total thickness.

For comparison, another electrode substrate was produced in the same manner as above except for using the C 106 S carbon fibers instead of the carbon fibers of Example 1.

The physical properties of the products obtained in Example 3 and also in Comparative Example 3 are shown in Table 4.

TABLE 4

| | Example 3 | | Comparative Example 3 | |
|---|---|---|---|---|
| Physical properties | gas-diffusion part | rib | gas-diffusion part | rib |
| Flexibility(in the direction parallel to the ditch) (D/d)(cm/cm) | 100 | | >500 | |
| Bulk density(g/cm³) | 0.4 | 0.7 | 0.36 | 0.7 |
| Pore diameter(μm) | 10-180 | 10-60 | 10-200 | 10-60 |
| Resistance(mΩ · cm) | 210 | 35 | 200 | 35 |

Notes:
Particularly, in the case of subjecting the each products to "TEFLON ®"-water repellent treatment and catalyst treatment, the product of Example 3 could be handled extremely easily giving a favorable result, however, in the same treatments, the product of Comparative Example 3 was large in warping and showed cracks and exfoliation partially.

EXAMPLE 4 and COMPARATIVE EXAMPLE 4

The uncalcined flexible electrode substrates provided with the rib, produced in Example 2 was joined directly to the both surfaces of the separator so that the respective top surfaces of the ribs contact with the both surfaces of the separator and flow channels in one of the substrates are perpendicular to those in the another substrate, by using a phenol resin as the adhesive under the joining conditions of the temperature of 130° C. under a pressure of 10 kgf/cm²G and the pressure holding time of 120 min. Thereafter, the thus joined materials were calcined at 2000° C. under a reduced pressure of several Torr and in a nitrogen atmosphere. A favorable product was obtained by the above-mentioned procedures without causing any warps, cracks and exfoliation.

For comparison, in Comparative Example 4, the conventional mold substrate provided with the rib was directly joined to the separator, and the thus joined materials were calcined. However, any satisfactory product was not obtained due to the occurrence of cracks in the composite electrode substrate.

EXAMPLE 5 and COMPARATIVE EXAMPLE 5

After directly joining the uncalcined flexible electrode substrates provided with the rib, produced in Example 3 to the both surfaces of the separator so that the respective top surfaces of the ribs contact both surfaces of the separator and flow channels in one of the substrates are perpendicular to those in the other substrate, while using a phenol resin as the adhesive under the same joining conditions as in Example 4, the thus joined materials were calcined at 2000° C. under a reduced pressure of several Torr and in a nitrogen atmosphere. A favorable product was obtained by the above-mentioned procedures without causing any warps, cracks and exfoliation.

For comparison, in Comparative Example 5, the conventional mold substrate provided with the rib was directly joined to the separator, and the thus joined materials were calcined. However, satisfactory product was not obtained due to the occurrence of cracks in the composite electrode substrate.

What is claimed is:

1. An electrode substrate for a fuel cell, which substrate is in contact with flow channels for a reactant gas and at least a part of which substrate comprises a flexible carbon material, said flexible carbon material having a flexibility raito D/d of not more that 200, wherein D is the diameter of curvature just before breakage of said flexible carbon material when bent, and d is the thickness of said carbon material, said flexible carbon material being obtained by (1) treating fibers selected from the fibers group of polyacrylonitriles, rayons, phenol resins, isotropic pitches and anisotropic pitches at a temperature of not lower than 1500° C. under a reduced pressure and/or in an inert atmosphere, (2) preparing a composite material comprising the thus prepared carbon fibers of 6 to 50 mm in mean length and 4 to 25 μm in diameter and an organic binding agent having a carbonizing yield of not less than 10%, (3) thermally molding the thus obtained composite material and (4) wholly carbonizing the thus molded material by calcining the same under a reduced pressure and/or in an inert atmosphere at a temperature of not lower than 850° C., said flexible carbon material thereby comprising carbon lumps derived from said binding agent, which lumps are dispersed in the matrix of said carbon fibers and restrain a plurality of said carbon fibers so as to slidably hold said carbon fibers one to another.

2. An electrode substrate for a fuel cell of the type having flow channels for a reactant gas, comprising a carbon fiber sheet in contact with said flow channels, said carbon fiber sheet having a flexibility ratio D/d of not greater than 200, wherein D is the diameter of curvature of said sheet, when bent, just before breakage, and d is the thickness of said carbon fiber sheet, wherein said carbon fiber sheet is comprised of (a) a matrix of carbon fibers having a mean length of not less than 6 mm and not greater than 50 mm and a diameter of between 4 to 25 μm, and (b) an organic binding agent having a carbonizing yield of not less than 10% dispersed throughout said matrix in the form of carbonized particles having diameters of from between 2 to 200 times the diameter of said carbon fibers, wherein said particles retain said carbon fibers in said matrix yet are physically and chemically unattached thereto so as to allow relative slippage to occur as between said particles and said carbon fibers, wherein said carbon fibers and particles are present in an amount of from 5 to 50%, and 5 to 70% by volume, respectively, based upon the total volume of said carbon fiber sheet.

3. An electrode substrate for a fuel cell according to claim 1, wherein said flexible carbon materials as the gas-diffusion part have been respectively stacked on the respective top surfaces of ribs on both surfaces of a ribbed separator, said ribs on the one surface of said separator being perpendicular to those on the another surface thereof.

4. An electrode substrate for a fuel cell according to claim 1, wherein said flexible carbon materials have been mechanically ribbed and respectively stacked on both surfaces of a separator so that the respective top surfaces of said ribs contact with the both surfaces of said separator.

5. An electrode substrate for a fuel cell according to claim 1, wherein said flexible carbon materials have been provided with ribs by molding mold ribs on said flexible carbon material so as to form into one body with said flexible carbon material and have been stacked on both surfaces of a separator so that the respective top surfaces of said ribs contact with the both surfaces of said separator.

6. An electrode substrate for a fuel cell according to claim 1, comprising (1) two said flexible carbon materials on one side of each of which a plurality of mutually parallel flow channels of a reactant gas have been provided by mechanical ribbing, said ribbed flexible carbon materials being joined to both surfaces of a separator so that the respective top surfaces of said ribs contact with the both surfaces of said separator and said flow channels in one of said ribbed flexible carbon materials are perpendicular to those in another said ribbed flexible carbon material, (2) said separator having extended parts which extend beyond a periphery of said flexible carbon material, which is parallel to said flow channels of a reactant gas therein and (3) peripheral sealers joined to the extended parts of said separator.

7. An electrode substrate for a fuel cell according to claim 6, wherein the top surfaces of said ribs of said ribbed flexible carbon material have been joined to said separator via a flexible graphite sheet by using an adhesive, and the thus joined materials have been calcined so as to form into one body as carbon at a temperature of not lower than 850° C. under a reduced pressure and/or in an inert atmosphere.

8. An electrode substrate for a fuel cell according to claim 7, wherein said peripheral sealers and said separator have been joined together via a flexible graphite sheet or a layer of a fluorocarbon resin.

9. An electrode substrate for a fuel cell according to claim 1, comprising (1) two ribbed flexible carbon materials obtained by molding mold ribs on said flexible carbon material so as to form into one body with said flexible carbon material, said ribbed flexible carbon materials being joined to both surfaces of a separator so that the respective top surfaces of said ribs contact with the both surfaces of said separator and flow channels of a reactant gas formed by said mold ribs in one of said ribbed flexible carbon materials are perpendicular to those in another said ribbed flexible carbon material, (2) said separator having extended parts which extend beyond a periphery of said flexible carbon material, which is parallel to said flow channels of a reactant gas therein, and (3) peripheral sealers joined to the extended parts of said separator.

10. An electrode substrate for a fuel cell according to claim 9, wherein said ribbed flexible carbon materials and said separator have been joined together via a flexible graphite sheet by using an adhesive, and the thus joined materials have been calcined so as to form into one body as carbon at a temperature of not lower than 850° C. under a reduced pressure and/or in an inert atmosphere.

11. An electrode substrate for a fuel cell according to claim 10, wherein said peripheral sealers and said separator have been joined together via a flexible graphite sheet or a layer of a fluorocarbon resin.

12. An electrode substrate for a fuel cell according to claim 1, comprising (1) two said flexible carbon materials on one side of each of which a plurality of mutually parallel flow channels have been provided by mechanical ribbing, said ribbed flexible carbon materials being joined on both surfaces of a separator so that the respective top surfaces of said ribs contact with the both surfaces of said separator and said flow channels of a reactant gas in one of said ribbed flexible carbon materials are perpendicular to those in another said ribbed flexible carbon material, (2) said separator having extended parts which extend beyond said flexible carbon material and (3) a manifold material provided with a flow passage for supplying a reactant gas, joined to the extended part of said separator.

13. An electrode substrate for a fuel cell according to claim 12, wherein the top surfaces of said ribs of said ribbed flexible carbon material and said separator have been joined together via a flexible graphite sheet by using an adhesive, and the thus joined materials have been calcined so as to form into one body as carbon at a temperature of not lower than 850° C. under a reduced pressure and/or in an inert atmosphere.

14. An electrode substrate for a fuel cell according to claim 13, wherein said manifold material and said separator have been joined together via a flexible graphite sheet or a layer of a fluorocarbon resin.

15. An electrode substrate for a fuel cell according to claim 1, comprising (1) two ribbed flexible carbon materials formed by molding mold ribs on said flexible carbon material so as to form into one body with said flexible carbon material, said ribbed flexible carbon materials being joined to both surfaces of a separator so that the respective top surfaces of said ribs contact with the both surfaces of said separator and said flow channels formed by said mold ribs in one of said ribbed flexible carbon materials are perpendicular to those in another said ribbed flexible carbon material, (2) said separator having an extended part which extends beyond said flexible carbon material and (3) a manifold material provided with a flow passage for supplying a reactant gas, joined to the extended part of said separator.

16. An electrode substrate for a fuel cell according to claim 15, wherein said ribbed flexible carbon material and said separator have been joined together via a flexible graphite sheet by using an adhesive, and the thus joined materials have been calcined so as to form into one body as carbon at a temperature of not lower than 850° C. under a reduced pressure and/or in an inert atmosphere.

17. An electrode substrate according to claim 16, wherein said manifold material and said separator have been joined together via a flexible graphite sheet or a layer of a fluorocarbon resin.

* * * * *